United States Patent [19]

Walton

[11] 4,446,694

[45] May 8, 1984

[54] ELECTRIC REGENERATION SYSTEM FOR GAS TURBINE

[76] Inventor: Thomas A. Walton, 15327 Gran Vista Dr., Houston, Tex. 77083

[21] Appl. No.: 350,220

[22] Filed: Feb. 19, 1982

[30] Foreign Application Priority Data

Feb. 20, 1981 [CA] Canada .................................. 371446

[51] Int. Cl.³ .............................................. F02C 6/18
[52] U.S. Cl. ................................ 60/39.182; 60/39.511
[58] Field of Search ............ 60/39.182, 39.511, 39.512

[56] References Cited

U.S. PATENT DOCUMENTS 2,633,707  4/1953  Hermitte et al. ............. 60/39.511 X

FOREIGN PATENT DOCUMENTS 45-41521  12/1970  Japan .................................. 60/39.511

Primary Examiner—Louis J. Casaregola
Assistant Examiner—Donald E. Stout

[57] ABSTRACT

The present invention relates to an electric regenerator for use with a gas turbine. The gas turbine must have at least one compressor stage and one combustion stage and an interconnecting duct. The regenerator comprises an electrical heating element located within the duct. The heating element is supplied with electrical power generated from exhaust gas exiting from the combustion stage, wherein the temperature of the heating element is greater than the temperature of the compressed gas flowing in the duct.

5 Claims, 1 Drawing Figure

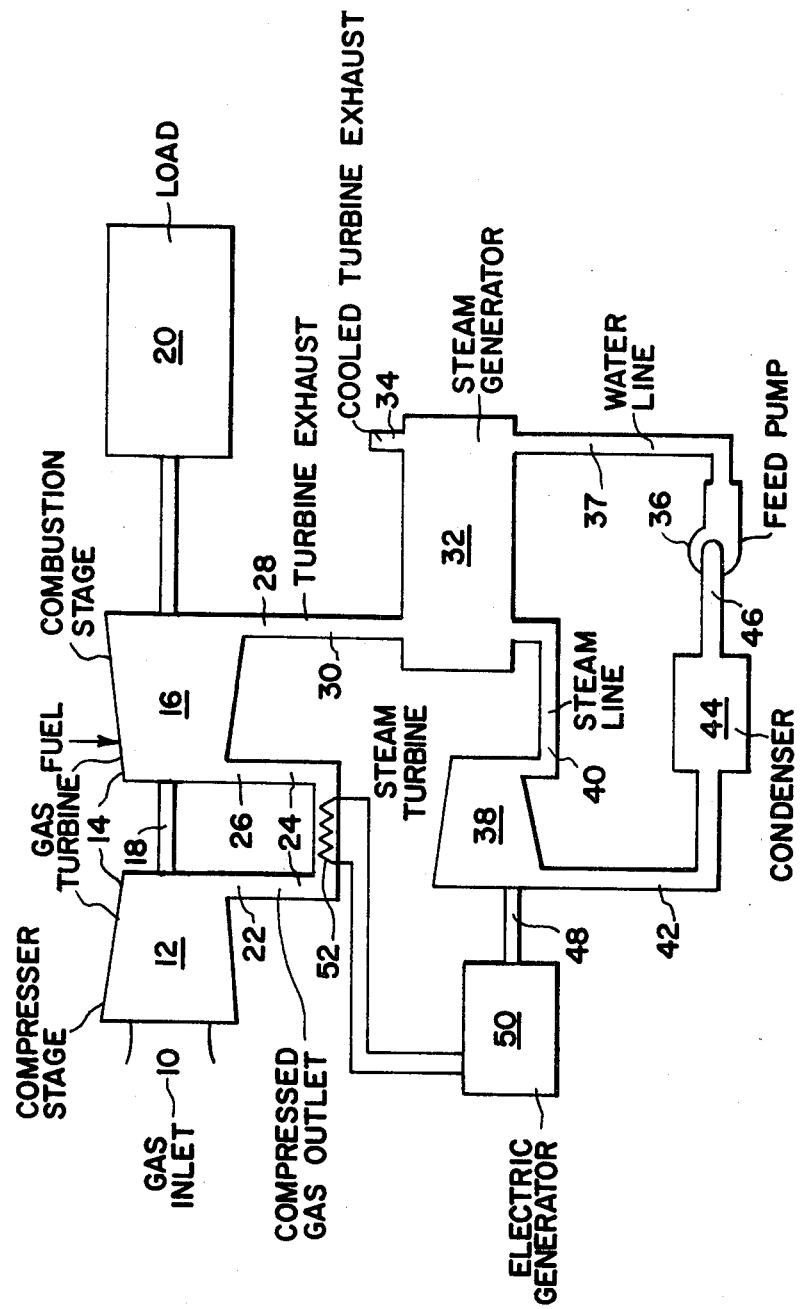

ELECTRIC REGENERATION SYSTEM FOR GAS TURBINE

The present invention relates to a regeneration system for improving the efficiency of a gas turbine. More particularly, the invention relates to an electric regeneration system.

It is known to provide a regeneration system for improving the efficiency of gas turbines. Prior art systems take the hot exhaust gas of the turbine and, via a heat exchanger, transfer the heat energy contained therein to the already heated gas exiting from the compressor stage of a gas turbine. The additionally heated gas exiting from the heat exchanger is fed to the combustion stage of the turbine. In this way the efficiency of the turbine is improved.

However, for such a system to have an improving effect on the efficiency of a gas turbine, the temperature of the compressed gas exiting the compressor stage of the turbine must be lower than the exhaust gas exiting the turbine stage. As the temperature of the gas exiting the compressor stage approaches the temperature of the turbine exhaust gas, very little energy exchange takes place and the improvement in efficiency due to the regenerative cycle becomes small. In fact, with some modern gas turbines having high compression ratios in the compressor stage, the temperature of the gas exiting the compression stage is higher than the temperature of the exhaust gas exiting the gas turbine stage and in such instances a conventional regenerative system would have a negative effect on turbine efficiency. The present invention is particularly useful with such high compression ratio turbines, but is not in any way limited to use with them.

The present invention uses the wasted exhaust gas of the turbine to generate steam. The steam operates a steam turbine which runs an electrical generator. The generated electric power is fed to an electrical heating means which elevates the temperature of the compressed gas exiting the compressor stage of the turbine. The additionally heated gas is fed to ducts which exhaust into the combustion stage of the turbine. In this way the compressed gas feeding the combustion stage can be further heated by exhaust gas heat energy, even though the temperature of the compressed gas as it exits the compressor stage is higher than the temperature of the exhaust gas exiting the turbine stage. In this way, the efficiency of a gas turbine having a high compression ratio compressor stage can be improved using an electrical regenerator.

It has also been calculated that the efficiency of an existing regenerative gas turbine can be improved using this electrical regenerative technique.

The electrical heating means can be constructed in many ways. The simplest way is to merely insert electrical resistance type heating elements in the duct joining the compressor and combustion stages of the turbine. These heating elements may take the form of, or are encased in, an aerodynamic shape to reduce drag in the duct. This configuration is best used with a turbine which has been designed to use a regenerator, but which does not have one installed. In a gas turbine which has been designed to use a regenerator, and which is using a regenerator, the heating means can take the form of electrical heating elements supported in the regenerator duct downstream of the regenerator in the regenerator loop. Another embodiment could provide the electrical heating means in parallel with the regenerator in the regenerator loop.

In gas turbines that are not designed for a regenerator such as high compression ratio industrial gas turbines, the heating means can take the form of a series of small electrical resistance elements. These elements can be installed between the exit of the gas compressor stage and the combustion stage. The heating elements could be installed directly into the combustion chambers themselves. Some turbines, for example the Rolls Royce RB211 (trade mark) turbine uses a split shaft drive. In such a configuration, one shaft connects a power turbine or turbines with a compressor or compressors and one shaft connects a power turbine to an external load. The electrical heating elements could be installed between two turbine stages in such a turbine in order to improve the efficiency of the turbine.

In each instance, the electrical heating elements can be aerodynamically shaped and used to replace other parts as, for example, stator blades or internal support members such as struts.

The heating elements in most cases have to be relatively small which necessitates a very high operating temperature. As a result, they can be made of materials having high melting temperatures such as tungsten.

An alternate embodiment transfers heat energy into the compressor gas flow by induction. The induction furnace comprising a coil, forms part of the duct or is placed within the duct. The induction furnace has metal parts which are heated by induction and which are suspended in the compressed gas flow. These parts impart their heat energy to the compressed gas flow.

The electrical energy, in yet another embodiment, is transferred to the compressed gas flow by sustaining an arc within the gas flow or within a sealed, finned housing.

Finally, the electrical energy could be transferred into heat energy by any of the above mentioned forms in a secondary fluid which is, in turn, heat exchanged with the compressed gas flow. The secondary fluid could be either a liquid or a gas.

It is therefore an object of the present invention to provide an electrical gas regenerator system for use with a gas turbine which improves the efficiency of the turbine.

In accordance with an aspect of the invention there is provided an electric regenerator for use with a gas turbine having at least one compressor stage, one combustion stage and at least one turbine stage each being interconnected by duct means which contain and direct compressed gas, said regenerator comprising an electrical heating means located within said duct, said heating means being supplied with electrical power generated from exhaust gas exiting from said gas turbine, wherein the temperature of said heating means is greater than the temperature of compressed gas flowing in said duct means at the location of said electric heating means.

The present invention will be described in detail hereinbelow with the aid of the accompanying drawing which is a schematic representation of an electrical regeneration system for a gas turbine according to the present invention.

Ambient temperature air is drawn into an air intake 10 of a gas compressor stage 12 of a gas turbine 14. The gas compressor 12 is connected to a combustion/turbine stage 16 by a shaft 18. The gas compressor stage 12 compresses a gas, for example air, and exhausts its from outlet port 22 into an intermediate duct 24. The duct 24 feeds the compressed gas into the combustion stage 16 via an inlet port 26. The compressed gas and a fuel are combined and ignited in the combustion stage which drives shaft 18 via the turbine to operate both compressor stage 12 and load 20. Some turbine engines have multiple shafts and multiple compressor and turbine stages. This invention can be applied equally well to such turbines. Hot exhaust gas is exhausted from the combustion/turbine stage 16 at outlet port 28. This exhaust gas has an elevated temperature above ambient, and the heat energy of the exhaust gas is wasted energy. The present invention extracts some of this wasted heat energy and transfers it into useful power to further turn shaft 18 to thereby increase the efficiency of the gas turbine.

An exhaust duct 30 connects outlet port 28 to a steam generator 32. The hot exhaust gas gives up some of its heat energy within generator 32 and finally exhausts from outlet port 34.

A feed pump 36 circulates water through the steam generator 32 via water line 37. The water is converted into steam and drives a steam turbine 38 via a steam line 40. Remaining steam exits the steam turbine 38 via line 42 and is converted back into water by condenser 44. The condensed water returns to pump 36 via line 46 and is continuously recycled.

The shaft 48 of the steam turbine 38 is connected to an electric generator 50. The output of the generator 50 is fed to an electrical heating element 52 which is in contact with the compressed gas in duct 24.

In operation, wasted heat energy in the exhaust gas exiting combustion stage 16 is converted into steam and then electric energy by steam generator 32, steam turbine 38 and electric generator 50. The electrical energy is, in turn, converted into heat energy by heat element 52 which raises the temperature of the compressed gas entering the combustion stage. This heat energy produces more shaft power in the turbine thereby increasing its efficiency. The temperature of the heating element can be increased above that of the compressed gas for virtually all practical compression ratios of the compressor stage. As a result, there is always a positive flow of energy resulting in an increased turbine efficiency.

I claim:

1. An electric regenerator for use with a gas turbine having at least one compressor stage, one combustion stage and at least one turbine stage, each being interconnected by duct means which contain and direct compressed gas, said regenerator comprising an electric heating means located within said duct means, said heating means being supplied with electrical power generated from exhaust gas exiting from said gas turbine, wherein the temperature of said heating means is greater than the temperature of said compressed gas flowing in said duct means at the location of said electric heating means.

2. The electric regenerator of claim 1 wherein a steam generator is provided for receiving said exhaust gas, said exhaust gas giving up heat energy within said steam generator, said steam generator being connected to a steam turbine which drives an electric generator for supplying said electrical power.

3. The electric regenerator of claim 2 wherein said heating means is at least one electrical resistance element.

4. The electric regenerator of claim 1, wherein said duct means includes a duct connecting one of at least said one compressor stage with said combustion stage, said electrical heating means being located within said duct.

5. The electric regenerator of claim 1, wherein said gas turbine has first and second turbine stages, wherein said duct means includes a duct connecting said first and second turbine stage, said electrical heating means being located within said duct.